(12) United States Patent
Bosscher et al.

(10) Patent No.: US 8,694,134 B2
(45) Date of Patent: Apr. 8, 2014

(54) REMOTE CONTROL INTERFACE

(75) Inventors: Paul M. Bosscher, West Melbourne, FL (US); Matthew D. Summer, Melbourne, FL (US); John B. Rust, Palm Bay, FL (US); Loran J. Wilkinson, Palm Bay, FL (US); William S. Bowman, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 216 days.

(21) Appl. No.: 13/101,618

(22) Filed: May 5, 2011

(65) Prior Publication Data

US 2012/0283877 A1 Nov. 8, 2012

(51) Int. Cl.
*G05B 13/00* (2006.01)

(52) U.S. Cl.
USPC .......... 700/85; 700/264; 700/275; 901/2; 901/8

(58) Field of Classification Search
None
See application file for complete search history.

(56) References Cited

U.S. PATENT DOCUMENTS

| | | | |
|---|---|---|---|
| 3,280,991 A * | 10/1966 | Hedin et al. ............... | 414/5 |
| 3,637,092 A | 1/1972 | George et al. | |
| 4,216,467 A * | 8/1980 | Colston ............... | 341/20 |
| 4,521,685 A | 6/1985 | Rebman | |
| 4,604,016 A | 8/1986 | Joyce | |
| 4,655,673 A | 4/1987 | Hawkes | |
| 4,661,032 A | 4/1987 | Arai | |
| 4,762,006 A | 8/1988 | Asakawa et al. | |
| 4,791,588 A | 12/1988 | Onda et al. | |
| 4,795,296 A | 1/1989 | Jau | |
| 4,837,734 A | 6/1989 | Ichikawa et al. | |
| 4,842,308 A | 6/1989 | Spotts | |
| 4,853,874 A | 8/1989 | Iwamoto et al. | |
| 4,860,215 A | 8/1989 | Seraji | |
| 4,862,751 A | 9/1989 | Asakawa et al. | |
| 4,893,981 A | 1/1990 | Yoshinada et al. | |

(Continued)

FOREIGN PATENT DOCUMENTS

| | | |
|---|---|---|
| EP | 0672507 A1 | 9/1995 |
| EP | 1 876 505 A1 | 1/2008 |

(Continued)

OTHER PUBLICATIONS

European Search Report mailed Mar. 14, 2012, Application Serial No. 11009319.2-2316, in the name of Harris Corporation.

(Continued)

*Primary Examiner* — Sean Shechtman
*Assistant Examiner* — Patrick Cummins
(74) *Attorney, Agent, or Firm* — Fox Rothschild, LLP; Robert J. Sacco

(57) ABSTRACT

Interface (101) for converting human control input gestures to telematic control signals. The interface includes a plurality of articulating arms (107a, 107b, 108a, 108b, and 109a, 109b) each mounted at a base end (113, 115, 117) to an interface base and coupled at an opposing end to a housing (106). The articulating arms are operable to permit linear translational movement of the housing in three orthogonal directions. At least one sensor (116) of a first kind is provided for measuring the linear translational movement. A pivot member (201) is disposed in the housing and is arranged to pivot about a single pivot point. A grip (102) is provided and is attached to the pivot member so that a user upon grasping the grip can cause the pivot to rotate within the housing.

24 Claims, 5 Drawing Sheets

(56) References Cited

U.S. PATENT DOCUMENTS

| | | | |
|---|---|---|---|
| 5,004,391 | A | 4/1991 | Burdea |
| 5,007,300 | A | 4/1991 | Siva |
| 5,018,922 | A | 5/1991 | Yoshinada et al. |
| 5,092,645 | A | 3/1992 | Okada |
| 5,184,319 | A | 2/1993 | Kramer |
| 5,193,963 | A | 3/1993 | McAffee et al. |
| 5,231,693 | A | 7/1993 | Backes et al. |
| 5,382,885 | A | 1/1995 | Salcudean et al. |
| 5,451,924 | A | 9/1995 | Massimino et al. |
| 5,508,596 | A | 4/1996 | Olsen |
| 5,565,891 | A | 10/1996 | Armstrong |
| 5,589,828 | A | 12/1996 | Armstrong |
| 5,619,180 | A | 4/1997 | Massimino et al. |
| 5,694,013 | A | 12/1997 | Stewart et al. |
| 5,737,500 | A | 4/1998 | Seraji et al. |
| 5,792,165 | A | 8/1998 | Klieman et al. |
| 5,831,408 | A | 11/1998 | Jacobus et al. |
| 6,028,593 | A | 2/2000 | Rosenberg et al. |
| 6,047,610 | A | 4/2000 | Stocco et al. |
| 6,084,587 | A | 7/2000 | Tarr et al. |
| 6,088,017 | A | 7/2000 | Tremblay et al. |
| 6,104,158 | A | 8/2000 | Jacobus et al. |
| 6,184,868 | B1* | 2/2001 | Shahoian et al. ............ 345/161 |
| 6,191,796 | B1 | 2/2001 | Tarr |
| 6,246,390 | B1 | 6/2001 | Rosenberg |
| 6,271,833 | B1 | 8/2001 | Rosenberg et al. |
| 6,281,651 | B1 | 8/2001 | Haanpaa et al. |
| 6,522,952 | B1 | 2/2003 | Arai et al. |
| 6,535,793 | B2 | 3/2003 | Allard |
| 6,636,161 | B2 | 10/2003 | Rosenberg |
| 6,705,871 | B1 | 3/2004 | Bevirt et al. |
| 6,781,569 | B1 | 8/2004 | Gregorio et al. |
| 6,793,653 | B2 | 9/2004 | Sanchez et al. |
| 6,801,008 | B1 | 10/2004 | Jacobus et al. |
| 6,857,878 | B1 | 2/2005 | Chosack et al. |
| 7,138,981 | B2 | 11/2006 | Kim et al. |
| 7,158,112 | B2 | 1/2007 | Rosenberg et al. |
| 7,168,748 | B2 | 1/2007 | Townsend et al. |
| 7,225,404 | B1 | 5/2007 | Zilles et al. |
| 7,345,672 | B2 | 3/2008 | Jacobus et al. |
| 7,480,600 | B2 | 1/2009 | Massie et al. |
| 7,714,895 | B2 | 5/2010 | Pretlove et al. |
| 7,783,384 | B2 | 8/2010 | Kraft |
| 8,226,072 | B2 | 7/2012 | Murayama |
| 8,447,440 | B2 | 5/2013 | Phillips et al. |
| 8,473,101 | B2 | 6/2013 | Summer |
| 2001/0002098 | A1 | 5/2001 | Haanpaa et al. |
| 2001/0037163 | A1 | 11/2001 | Allard |
| 2003/0169235 | A1* | 9/2003 | Gron et al. .................... 345/167 |
| 2004/0189675 | A1 | 9/2004 | Pretlove et al. |
| 2004/0254771 | A1 | 12/2004 | Riener et al. |
| 2005/0252329 | A1 | 11/2005 | Demers |
| 2006/0048364 | A1 | 3/2006 | Zhang et al. |
| 2006/0066574 | A1 | 3/2006 | Kim et al. |
| 2007/0050139 | A1* | 3/2007 | Sidman .......................... 701/220 |
| 2007/0095582 | A1 | 5/2007 | Stuijt et al. |
| 2008/0009971 | A1 | 1/2008 | Kim et al. |
| 2008/0063400 | A1 | 3/2008 | Hudson et al. |
| 2009/0182436 | A1 | 7/2009 | Ferrara |
| 2010/0019890 | A1 | 1/2010 | Helmer et al. |
| 2010/0041991 | A1 | 2/2010 | Roundhill |
| 2010/0070079 | A1 | 3/2010 | Mangaser et al. |
| 2010/0092267 | A1 | 4/2010 | Najdovski et al. |
| 2010/0100256 | A1 | 4/2010 | Jurmain et al. |
| 2010/0168918 | A1 | 7/2010 | Zhao et al. |
| 2010/0169815 | A1 | 7/2010 | Zhao et al. |
| 2011/0015569 | A1 | 1/2011 | Kirschenman et al. |
| 2011/0046781 | A1 | 2/2011 | Summer |
| 2011/0155785 | A1 | 6/2011 | Laurent et al. |
| 2012/0185098 | A1 | 7/2012 | Bosscher et al. |
| 2012/0185099 | A1 | 7/2012 | Bosscher et al. |

FOREIGN PATENT DOCUMENTS

| | | |
|---|---|---|
| FR | 2 898 824 A1 | 9/2007 |
| GB | 2 228 783 A | 9/1990 |
| WO | 95 30571 A1 | 11/1995 |
| WO | WO-03 055061 A1 | 7/2003 |
| WO | 2006 016799 A1 | 2/2006 |
| WO | WO-2008 135978 | 11/2008 |
| WO | 2010 040215 A1 | 4/2010 |
| WO | WO-2010/085184 A1 | 7/2010 |
| WO | WO-2011075093 | 6/2011 |

OTHER PUBLICATIONS

Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.

Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.

Suzuki, A., et al., "Performance conditioning of time delayed bilaterial teleoperation system by scaling down compensation value of communication disturbance observer", Advanced Motion Control, 2010, 11th IEEE International Conference on, IEEE, Piscataway, NJ, USA, Mar. 12, 2010, pp. 524-529.

Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tomorrow, IEEE-Piscataway, NJ, USA, Piscataway, NJ, USA, May 19, 2008, pp. 212-219.

International Search Report mailed May 23, 2012; Application Serial No. PCT/US2011/066873 in the name of Harris Corporation.

Everett L J et al; "Automatic Singularity Avoidance Using Joint Variations in Robot Task Modification", IEEE Robotics & Automation Magazine, IEEE Service Center, Piscataway, NJ, US, vol. 1, No. 3, Sep. 1, 1994, pp. 13-19, XP011420425.

Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1996 L EEE/RSJ International Conference on Osaka, Japan, Nov. 4-8, 1996, New York, NY, USA, IEEE, US, vol. 2, Nov. 4, 1996, pp. 425-430, XP010212433.

Hamid Abdi et al: "Joint Velocity Redistribution for Fault Tolerant Manipulators", Robotics Automation and Mechatronics (RAM), 2010 IEEE Conference on, IEEE, Piscataway, NJ, USA, Jun. 28, 2010, pp. 492-497, XP031710198.

International Search Report mailed Jun. 28, 2012, Application Serial No. PCT/US2012/027475 in the name of Harris Corporation.

Marshall, W.C., et al., "A Testbed for Deisgn of User-Friendly, Multiple-Degree-Of-Freedom, Manual Controllers", Scientific Honeyweller, Honeywell's Corporate. Minneapolis, US Jan. 1, 1993, pp. 78-86.

International Search Report dated Oct. 29, 2012; Application Serial No. PCT/US2012/034207 in the name of Harris Corporation.

International Search Report dated Jan. 15, 2013, Application Serial No. PCT/US2012/037751 in the name of Harris Corporation.

International Search Report mailed Jan. 4, 2013, International Application Serial No. PCT/US2012/058303 in the name of Harris Corporation.

Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.

Rogers, JE., et al., "Bi-directional Gap Closing MEMS Actuator Using Timing and Control Techniquest", IEEE Industrial Electronics, IECON 2006—32nd Annual Conference on, IEEE, Piscataway, NJ USA Nov. 1, 2006, pp. 3469-3154.

(56) References Cited

OTHER PUBLICATIONS

U.S. Appl. No. 13/761,321, filed Feb. 7, 2013, Systems and Methods for Controlling Movement of Unmanned Vehicles.

U.S. Appl. No. 13/672,774, filed Nov. 9, 2012, Hybrid Gesture Control Haptic System.

Alqasemi R et al: "Kinematics, control and redundancy resolution of a 9-DoF wheelchair-mounted robotic arm system for ADL tasks", Mechatronics and Its Applications, 2009. ISMA '09. 6th International Symposium on, IEEE, Piscataway, NJ, USA, Mar. 23, 2009, pp. 1-7.

Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998, pp. 2580-2585.

Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004, pp. 2790-2796.

International Search Report mailed May 2, 2013, International Application No. PCT/US2012/051314, in the name of Harris Corporation.

\* cited by examiner

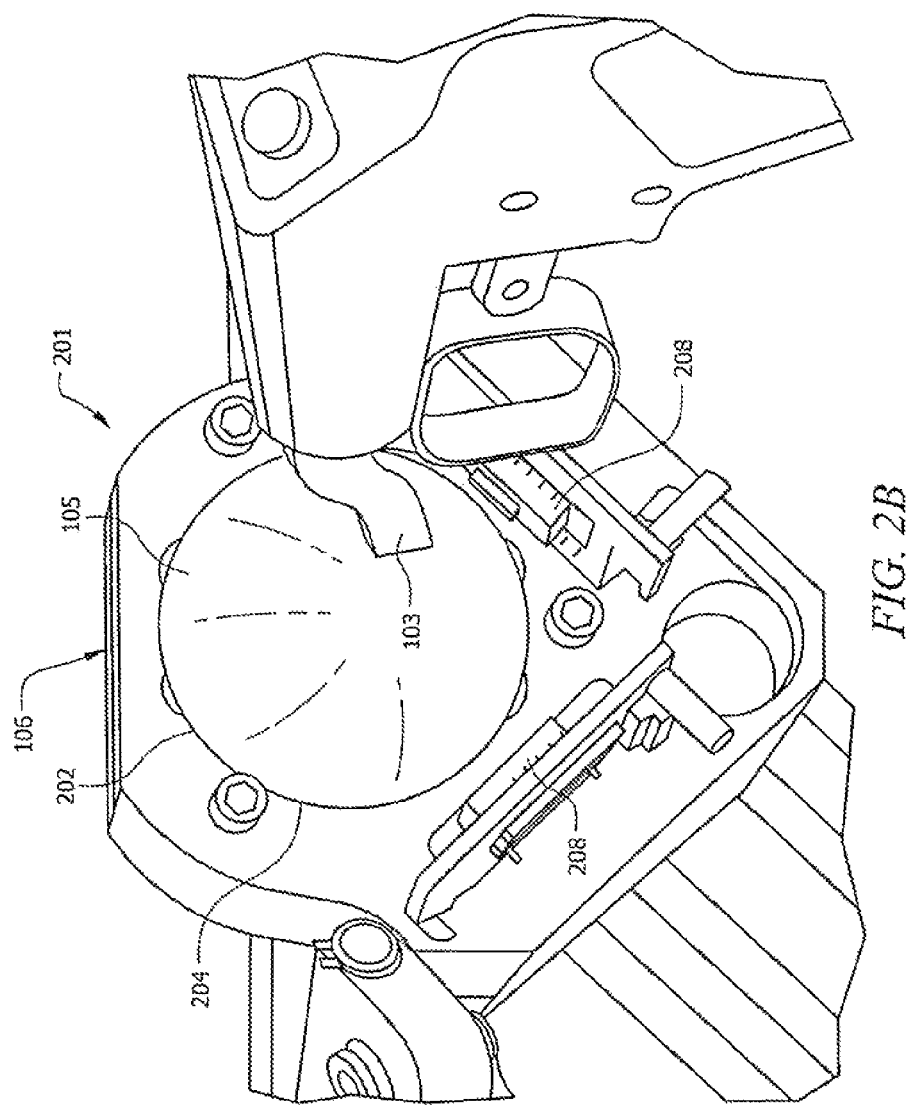

REMOTE CONTROL INTERFACE

BACKGROUND OF THE INVENTION

1. Statement of the Technical Field

The inventive arrangements relate to telematic control systems, and more particularly to an interface for converting human control input gestures to telematic control signals.

2. Description of the Related Art

Robotic systems are growing increasingly common for use in areas in which a human may be subjected to dangerous or otherwise unpleasant work environments. Such applications include explosive ordinance disposal, search and rescue missions, environmental analysis or inspection at toxic sights and the like. These robotic systems are typically controlled remotely. Control units for teleoperation of robotic systems can sense control inputs provided by a user. These control inputs can be measured by one or more sensors and converted into corresponding signals that are transmitted to the robotic system to cause it to move in a desired manner in accordance with the transmitted signals. Similar types of user interfaces can be used for controlling actions in a virtual environment as may be employed in computer gaming and/or simulators.

Simple user interface systems can provide a separately operable control for each movable joint of a robot or robotic manipulator. More complex systems can include hand controllers (sometimes in the form of a pistol grip), which sense the movement by a user's hand. The hand controller generates one or more control signals which are then used for actuating various motion operations of the robot. The control system of the robot will respond to these control signals by activating certain servo-motors, solenoids, or other devices within the robotic manipulator to produce the desired action. Similarly, in the case of a virtual environment, computer software is programmed to respond to signals generated by a hand controller to cause motion in a simulated or virtual environment.

Haptic technology or haptics involves tactile feedback provided by a device to a user. The tactile feedback is typically provided by applying forces, vibrations and/or motions to one or more portions of a user interface device. Haptics are sometimes used to enhance remote control devices associated with machines and virtual reality systems. For example, U.S. Pat. No. 5,831,408 to Jacobus et al. discloses that force feedback systems are sometimes used to communicate forces generated on a robotic hand back to a user, through a hand controller. If the robotic hand impacts an object, the impact is felt by the user's hand. Haptic feedback is commonly used in the computer gaming and simulation field.

In the field of robotics, haptic control systems generally include the ability to sense an absolute position/orientation and direction of movement of a haptic control interface when such movement is initiated by a user. Such absolute position/orientation sensing allows direct correspondence between the position/orientation of a hand control and the position/orientation of a robot device. The absolute position sensing schemes provide acceptable performance, but they inevitably involve use of complex mechanisms, usually including a plurality of gimbals with integrated sensors. The plurality of gimbals and sensors work together to define an absolute position/orientation of a user's hand. However, they also result in a relatively expensive control device and are subject to gimbal lock problems. The gimbals in particular also tend to be somewhat delicate so control devices of this kind are not particularly suited for field deployment.

SUMMARY OF THE INVENTION

The invention concerns an interface for converting human control input gestures to telematic control signals. The interface includes a plurality of articulating arms, each mounted at a base end to an interface base and coupled at an opposing end to a housing. The articulating arms are operable to permit linear translational movement of the housing in three orthogonal directions. At least one sensor of a first kind is provided for measuring the linear translational movement. A pivot member is disposed in the housing and is arranged to pivot about a single pivot point. A grip is provided and is attached to the pivot member so that a user upon grasping the grip can cause the pivot to rotate within the housing. More particularly, the pivot grip can cause the pivot point to roll, pitch, and yaw about a pivot point. At least one second sensor of second type is provided within the housing for detecting roll, pitch and yaw motion of the pivot member about the pivot point.

A control unit is provided which is responsive to a plurality of sensor signals produced by the first and second sensors for generating output control signals. These control signals are configured to remotely control linear translation movement in three orthogonal directions, and roll, pitch and yaw movement, of a remotely controlled object. The interface advantageously includes a trigger switch for selectively transitioning the control unit between an active state and an inactive state. The control unit exclusively provides the output control signals for linear translation movement and roll, pitch and yaw movement when in an active state.

The invention also concerns a method for converting human control input gestures to telematic control signals. The method involves determining a linear translation movement of a housing in three orthogonal directions. The linear translation movement is determined by sensing with at least a first sensor a change of position of a plurality of articulating arms mounted at a base end to an interface base and coupled at an opposing end to the housing. At least a second sensor senses a roll, pitch and yaw motion of a pivot member disposed in the housing about a single pivot point when acted upon by a grip attached thereto.

The method continues by generating with a control unit a plurality of output control signals responsive to a plurality of sensor signals produced by the first and second sensors. The control signals are generated for remotely controlling linear translation movement in three orthogonal directions, and roll, pitch and yaw movement, of a remotely controlled object (e.g. a robot arm). Notably, the control unit exclusively provides the output control signals for linear translation movement and roll, pitch and yaw movement when in an active state. Control signals are not provided in an inactive state. The control unit selectively transitions between the active state and an inactive state in response to a trigger switch operation.

BRIEF DESCRIPTION OF THE DRAWINGS

Embodiments will be described with reference to the following drawing figures, in which like numerals represent like items throughout the figures, and in which:

FIGS. 2a and 2b are show an enlarged portion of the control interface in FIG. 1.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The present invention concerns control interfaces, including haptic control interfaces, which are capable of controlling a remotely controlled object in as many as six directions (three orthogonal linear directions, and three orthogonal axes of rotation). The control interface provides improvements over similar six position controllers of the prior art which generally require absolute position information of a hand grip with regard to linear translation movement and rotation movement. The present invention is a departure from such conventional arrangements insofar as it uses a combination of articulating arms which support a housing. The articulating arms are mounted to a base by means of a hinge and the angular rotation of the hinge is measured to determine linear translation movement of the housing. This arrangement is coupled with a ball and socket type pivot arrangement provided in the housing. The ball and pivot arrangement are used to determine rotation of the grip (roll, pitch, yaw) relative to the base. The ball and pivot arrangement provides a means for measuring relative rotation of the grip about the housing. Consequently a more rugged control interface is provided, at lower cost, and without the problem of gimbal lock. These and other inventive features will become more apparent as the discussion progresses.

Figure 1:
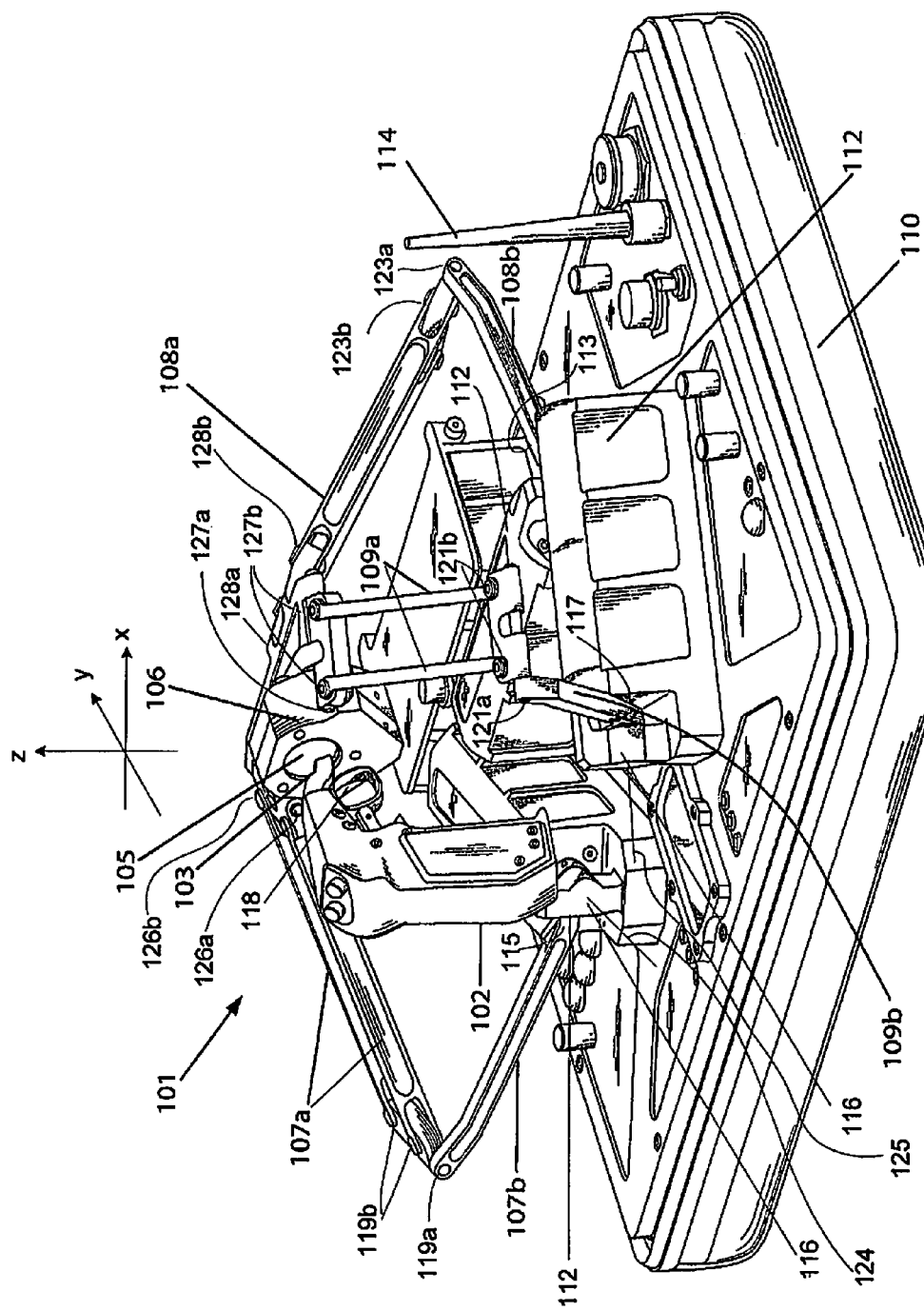
FIG. 1 is drawing which shows an interface for remotely controlling a slave device or object.

Referring now to FIG. 1, there is shown an interface 101 for converting human control input gestures to telematic control signals. The interface 101 includes a plurality of articulating arms 107a, 107b, 108a, 108b, and 109a, 109b, each mounted at a base end 113, 115, 117 to an interface base 110 and coupled at an opposing end to a housing 106. Each base end pivots on a single defined axis (e.g. 124, 125) in a hinge-like manner. The articulating arms are assembled from a plurality of gimbal joints which are operable to permit translational movement of a housing 106 in three orthogonal directions (x, y and z). More particularly, a center portion of the articulating arms can comprise a plurality of joints 119a, 119b, joints 121a, 121b, and joints 123a, 123b which permit arm rotation about two transverse axes. At a housing end of the arms joints 126a, 126b, 127a, 127b, and 128a, 128b also permit rotation about two transverse axes. The arrangement of the arms permit linear translation movement of housing 106 with respect to the x, y, and z orthogonal axes.

Notably, while the joints of the articulating arms are arranged to permit such linear translational movement, they are arranged such that the housing 106 is prevented from rotating. In other words, pitch, roll and yaw of the housing 106 is generally precluded by the attachment of the articulating arms 107a, 107b, 108a, 108b, and 109a, 109b to the housing. This type of mechanism is known in the art as a "Delta" mechanism, and the translation-only behavior of the housing has been shown in (Clavel, R., "Conception d'un robot parallèle rapide à 4 degrés de liberté," Ph.D. Thesis, EPFL, Lausanne, Switzerland, 1991).

At least one sensor of a first type is provided for measuring the movement of the articulating arms. The first type sensor 116 can be integrated within a motor housing 112 disposed on the base 110. In some embodiments, each articulating arm can be provided with a first type sensor to determine an angular orientation of base end (115, 113, 117) of articulating arms 107b, 108b, 109b relative to the base 110. For example, an angle sensor can be used for this purpose. Still, the invention is not limited in this regard and any other suitable sensor can be used provided that it is capable of measuring the relative rotation of articulating arms 107b, 108b, 109b relative to the base 110.

According to some embodiments, the outputs from the one or more first type sensors 116 can be used to determine the linear translation of the housing 106 with respect to the x, y, and z axis. Determining the translation of the housing 106 from the angle measurements provided by the joint angle sensors 116 is known in the art (see Clavel 1991).

A pivot member is disposed in the housing 106 and is arranged to pivot with regard to three axes about a single pivot point. In other words, the pivot member is configured to roll, pitch and yaw about the pivot point. Any suitable mechanical arrangement can be used to form such a pivot member. However, in a preferred embodiment, the pivot member can comprise a ball 105 including a ball surface which is at least partially spherical. The housing 106 can include a socket member for receiving the ball. A ball and socket arranged of this kind is described in further detail with respect to FIG. 2. A pin 103 is fixed to ball 105 and extends in a generally radial direction from the ball. The pin is securely attached at one end to a grip 102 so that movement of the grip is communicated to the ball. It will be appreciated that grip 102 is provided and is attached to the pivot member so that a user, upon grasping the grip, can cause the pivot member to rotate within the housing.

One or more second type sensors (not shown in FIG. 1) are mounted within housing 106 and can detect rotational motion of the ball 105 with regard to as many as three orthogonal axes (i.e., pitch, roll and yaw). The second type sensors can be any type sensor which is suitable to generate output signals which in combination allow the speed and direction of rotation of the ball to be completely determined.

Output signals from the first and second type sensor are advantageously used to generate data regarding movement of the grip 102 with regard to any one of six directions. This data is then used to generate control signals for the slave object. More particularly, a control unit is provided which is responsive to a plurality of sensor signals produced by the first and second type sensors for generating output control signals. In some embodiments, this control unit can be disposed within the base 110. The control signals generated by the control unit are configured to remotely control linear translation movement, and roll, pitch and yaw movement, of a remotely controlled object.

The interface 101 advantageously includes a trigger switch 118 for selectively transitioning the control unit between an active state and an inactive state. In some embodiments, the trigger switch 118 can be disposed on the grip 102 as shown in FIG. 1. Still, the invention is not limited in this regard and the trigger switch could be located on a different portion of the interface. The control unit is advantageously configured such that it provides the output control signals for linear translation movement, and roll, pitch and yaw movement only when the control unit is in an active state.

Figure 2A:
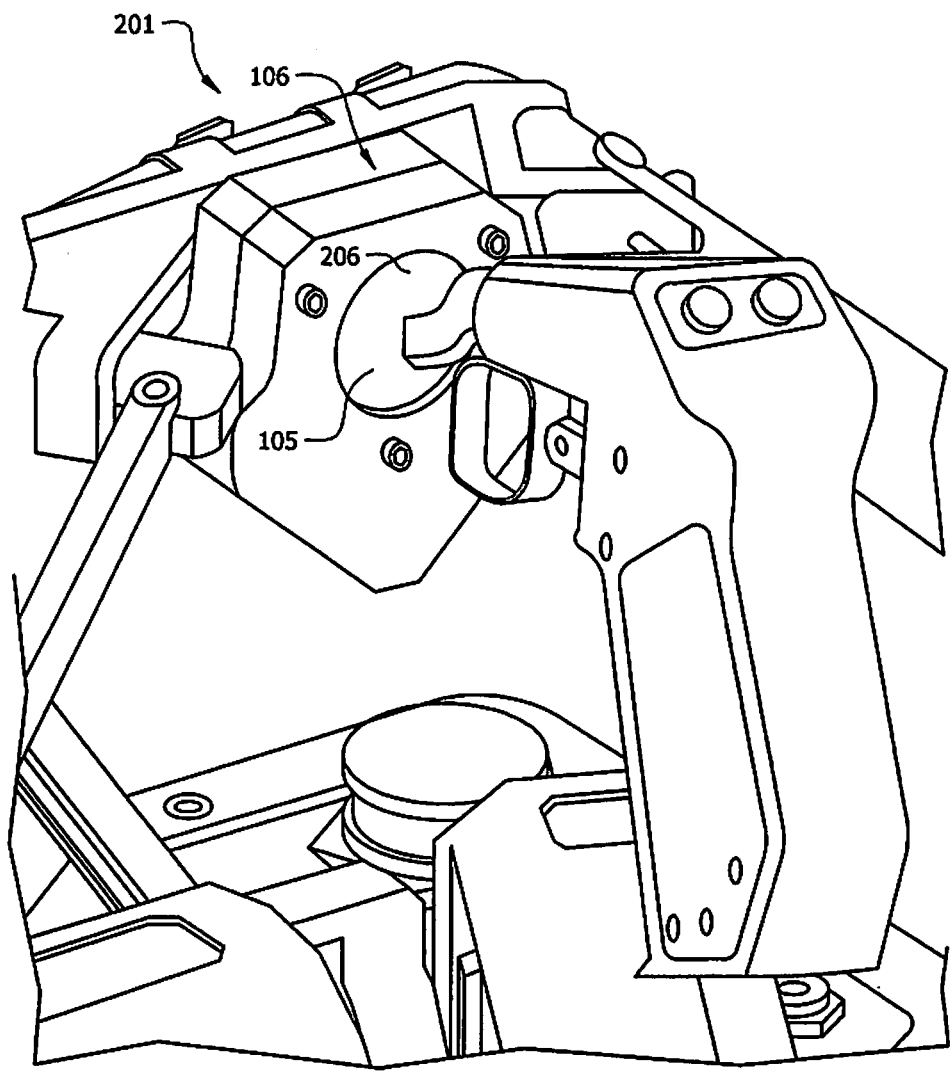

Referring now to FIGS. 2A and 2B, one embodiment of a pivot member and related structure is shown in greater detail. The pivot member includes housing 106 and ball 105 mounted therein so as to form a ball joint 201. The housing is shown partially cut away in FIG. 2B to reveal a socket 202 defined within the housing that is configured to accept ball 105. The socket 202 is at least partially spherical in shape. In preferred embodiments the ball 105 has a shape that is at least partially spherical in shape. The pivot member can pivot about a spherical center of the ball. In some embodiments, the external surface of the ball 105 is in direct mechanical contact or engagement with an inner surface 204 defined by the socket 202. As can be observed in FIG. 2B, the ball 105 is generally conformal to the inner surface 204 of the socket 202 and preferably fits snugly within the inner surface 204. According to some embodiments, the inner surface 204 forms a conjugate surface with respect to the outer surface of ball 105.

The housing 106 has an opening 206, which in some embodiments is circular; although it will be appreciated that other shapes can be used. Such an arrangement can be useful when desiring to limit movement of the ball to an extent defined by the opening 206. The pin 103 extends through the opening 206 as shown. In some embodiments, the diameter of the opening 206 is advantageously formed somewhat smaller than the diameter of the ball 105 in order to retain the ball 105 inside the socket 202. In other embodiments, the size of the opening 206 can be larger than the diameter of the ball 105, and the ball joint 201 can further include a sealing cup (not shown) fitted around the opening 206 and having an opening that is smaller than the diameter of the ball 105. In some embodiments the sealing cup can be tapered in shape and sealingly connect with the sidewall of the pin 103 so as to provide a protective cover that prevents debris from entering into the opening 206. The housing opening 206, the opening in the sealing cup, or both are dimensioned to allow the ball 105 to freely rotate within the limits defined by opening 206, the sealing cup, or both. In other words the ball 105 can roll, pitch and yaw within the socket 202.

The inner surface 204 can include a bearing surface (not shown) disposed inside the socket 202 to facilitate movement of the ball 105 in relation to the housing 106. The bearing surface in such embodiments can be detachably connected to the housing 106 or can be an integral part of the housing. The bearing surface can reduce friction between the ball 105 and the housing 106, which decreases wear and tear of the parts and extends the useful life of the ball joint 201. Preferably, the bearing surface is a low friction lining disposed between the socket 202 and the ball 105. However, other known means for reducing friction, such as bearings or fluids, can also be used to reduce friction in the devices disclosed herein in instead of or in addition to the low friction lining.

Sensors 208 are provided for sensing and measuring the movement of the ball 105 relative to the housing 106. The sensors are arranged so that they are collectively able to sense and measure rotation of the ball 105 with respect to as many as three orthogonal axes (roll, pitch and yaw). In preferred embodiments, the ball joint 201 includes at least two sensors 208. Each sensor is preferably capable of sensing ball rotation in at least two orthogonal directions. When two or more sensors are used in this way, it is preferable that they are spaced apart around the circumference of the ball 105 as shown. Such angular spacing can ensure that there is no ambiguity in the sensed rotation direction of the ball. According to some embodiments, the sensors 208 can be spaced apart at an angle of about 90°, but of course the invention is not limited in this regard. Optical sensors are particularly well suited for this purpose, but any sensor type may be employed, provided that it is capable of performing as described herein.

The first type sensors 116 and second type sensors 208, are electrically connected to control circuitry disposed, for example, in base 110 of the interface 101. Such control circuitry advantageously generates position data for grip 102 by using information concerning rotation of ball 105 within the housing 106 and information regarding the position of the articulating arms 107a, 107b, 108a, 108b, and 109a, 109b. This information is then used to generate control signals for controlling a remotely operated device or object. A data link can be used for the purpose of communicating motion control command signals to a device. In some embodiments, interface 101 can have an integrated data transceiver contained therein. If a wireless data transceiver is used for this purpose, the control unit 101 can include an antenna 114.

Figure 3:
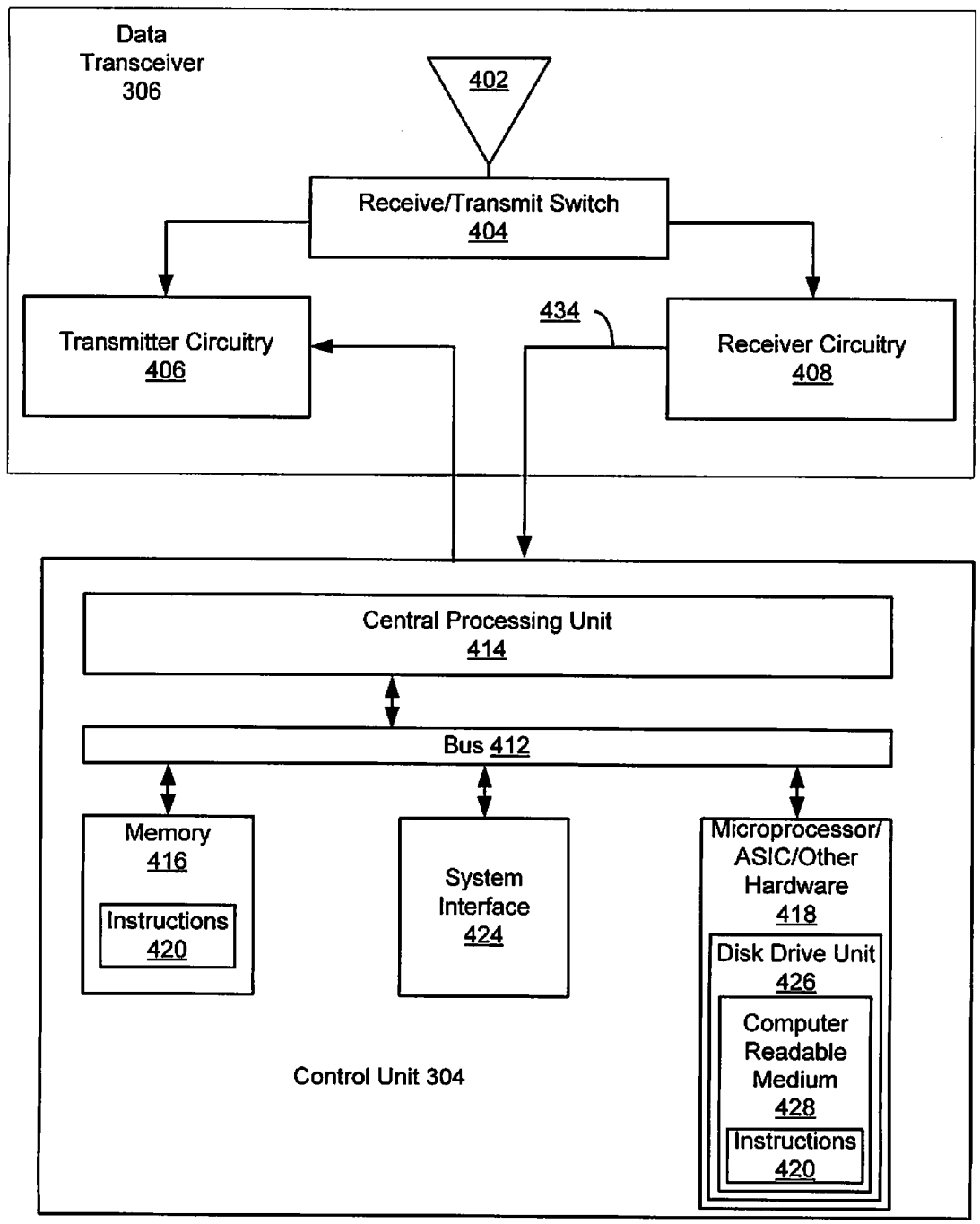
FIG. 3 is a block diagram which is useful for understanding a control unit for the interface in FIG. 1.

Referring now to FIG. 3, there is shown an exemplary control unit 304 which can be used in the present invention. As shown in FIG. 3, the control unit 304 comprises a system interface 424, a Central Processing Unit (CPU) 414, a system bus 412, a memory 416 connected to and accessible by other portions of the control unit 304 through system bus 412, and hardware entities 418 connected to system bus 412. System interface 424 allows the control unit 304 to receive data from first and second type sensors 116, 208 and from a trigger switch 118. The system interface can also permit the control unit 304 to monitor one or more additional function controls associated with the interface. The system interface can also be configured to allow control unit 304 to communicate with data transceiver 306, network equipment and other computing devices via a wired communications link. At least some of the hardware entities 418 perform actions involving access to and use of memory 416, which may be a random access memory (RAM), a disk drive, and/or a compact disc read only memory (CD-ROM).

Hardware entities 418 can include microprocessors, application specific integrated circuits (ASICs) and other hardware. Hardware entities 418 may include a microprocessor programmed for facilitating the provision of data communication services and robot control processing as described herein. In this regard, it should be understood that the microprocessor can access and run telematic control processing as described herein. The communication operations can include, but are not limited to, signal receiving operations, signal processing operations, signal generation operations, and signal communication operations. Such communication operations can facilitate communications with a remote device or object to facilitate motion control of such object.

As shown in FIG. 3, the hardware entities 418 can include a disk drive unit 426 comprising a computer-readable storage medium 428 on which is stored one or more sets of instructions 420 (e.g., software code) configured to implement one or more of the methodologies, procedures, or functions described herein. The instructions 420 can also reside, completely or at least partially, within the memory 416 and/or within the CPU 414 during execution thereof by the data transceiver 306. The memory 416 and the CPU 414 also can constitute machine-readable media. The term "machine-readable media", as used herein, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution that cause the control unit 304 to perform any one or more of the methodologies of the present disclosure. As evident from the above discussion, the control unit 304 implements one or more method embodiments of the present invention.

In some embodiments, it can be advantageous for the interface 101 to communicate with a remotely controlled device or object using a wired or wireless connection. A suitable data transceiver can be used for this purpose. For example, if a wireless connection is preferred, a data transceiver 306 can be provided. Notably, the data transceiver 306 may include more or less components than those shown in FIG. 3. However, the components shown are sufficient to disclose an illustrative embodiment implementing the present invention.

The data transceiver 306 comprises an antenna 402 for receiving and transmitting Radio Frequency (RF) signals. A receive/transmit (Rx/Tx) switch 404 selectively couples the antenna 402 to the transmitter circuitry 406 and receiver circuitry 408 in a manner familiar to those skilled in the art. The receiver circuitry 408 decodes the RF signals received from a remote communication device (associated with a remotely controlled device) to derive information therefrom. The receiver circuitry 408 is coupled to control unit 304 via an electrical connection 434. The receiver circuitry 408 provides decoded RF signal information to the control unit 304. The control unit 304 uses the decoded RF signal information in accordance with the function(s) of the invention as described herein. The user interface 101, control unit 304, and data transceiver 306 can together comprise a telematic control system.

The telematic control system described above can be used for generating output signals to control a remote slave device. The remote slave device can be a robotic device, such as a robot arm and/or unmanned ground vehicle. Alternatively, the remote slave device can exist within a virtual environment such a computer simulation or a computer game. In such cases, the control signals generated by the telematic control system can be used by a computer simulation or gaming system to produce apparent motion of an object within a virtual environment. Such object within a virtual environment can be understood as a slave device for purposes of the present invention.

One or more actuators, motors or servo motors (not shown) can be disposed in the base 110 for applying a force to the articulating arms 107a, 107b, 108a, 108b, and 109a, 109b. More particularly, such motors can be disposed in motor housings 112 which are provided as part of base 110. The force generated by the motors is used to provide haptic feedback to the user. Additional actuators for providing haptic feedback to a user can be provided within grip 102. For example, such an actuator can exert a force upon a trigger 118. The control unit 304 in such embodiments receives haptic sensor signals from a remotely operated device. In particular, such sensor signals can indicate forces exerted upon the remotely operated slave device. When received by the control unit 304, these sensor signals are used to control the actuators in base 110 for applying a force to the articulating arms 107a, 107b, 108a, 108b, and 109a, 109b. Haptic feedback systems as described herein are generally known in the art.

Figure 4:
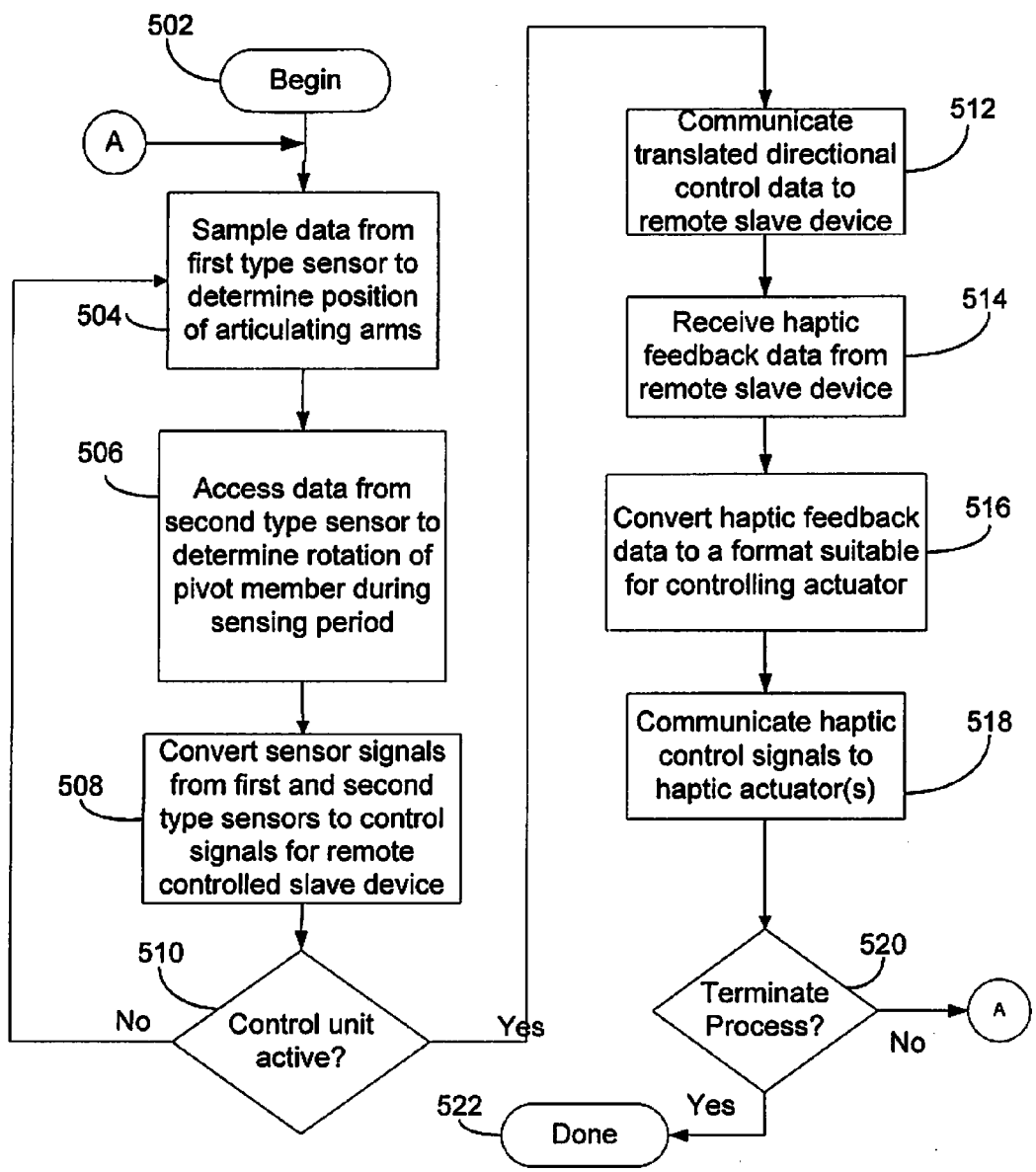
FIG. 4 is a flowchart that is useful for understanding the operation of the interface in FIG. 1.

In general, interface 101 can use sensor output signals from the first and second type sensors to determine the movement of grip 102. The control unit 304 also generates rotation command signals to a slave device or object. Any suitable method can be used to generate such linear and rotation command signals based on the pivot member rotation detected by the sensors 208. Referring now to FIG. 4, there is provided a flowchart that is useful for understanding a method aspect of the present invention. The method can begin in step 502 and continue with step 504.

In step 504, the control unit samples data from the first type of sensor to determine a position of articulating arms 107a, 107b, 108a, 108b, and 109a, 109b. In step 506, the control unit samples data from the second type of sensor to determine a rotation of the pivot member. In step 508, the linear translation and rotation command signals are generated by the control unit.

In some embodiments, the sampled data from the first type sensor can be absolute position data. In other words, the sampled data from the first type sensors can be sufficient to determine an absolute position of the housing 106, with respect to the base 110, based on the position of the articulating arms. Based on this absolute position information, the control unit 304 can in step 508 generate suitable linear translation command signals to cause movement of a slave device or object which corresponds to movement of grip 102. For example, in some embodiments, the control unit can generate linear translation commands to cause a slave device to move to a specific predetermined position that corresponds with a particular absolute position of the grip. In other embodiments, a position of the slave device need not correspond to an absolute position of the grip. Instead, relative changes in grip position can be used as a basis for generating motion commands in step 508 for linear translation of the slave device position. Those skilled in the art will appreciate that the exact nature of the linear translation command signals communicated to a slave device or object can vary depending upon the configuration of the slave device or object.

The data provided by the second type sensor (208) can be sufficient to provide absolute or relative position data to the control unit. According to one aspect of the invention, the sample data from the second type of sensor 208 is sufficient to provide and absolute position of the grip 102. In such instances, the rotation command signals can be determined in step 508 in a manner similar to the linear translation command signals. Alternatively, the sample data from the second type of sensor 208 may not provide absolute position information of the pivot member. Instead, the position of the pivot member is evaluated periodically to determine the angular velocity of a pivot member during some predetermined sensing period (e.g. 0.01 seconds). The control unit uses the angular velocity information provided by the second type sensors (208) to determine a desired relative motion with respect to the slave device or object. In such instances, the position/orientation of the slave device does not correspond to an absolute position/orientation of the grip.

Use of such angular velocity measurements can be useful because, in such implementations, the control unit 304 does not require information regarding the absolute position (rotation) of the pivot member. Instead, all that is needed is the angular velocity of rotation for the pivot member during some measured period of time (e.g. 0.01 seconds). In other words, the control unit in such case does not track the absolute position of the pivot member rotation, but instead determines angular velocity of rotation (velocity and angular direction) during a measurement period to determine appropriate rotation command signals. Still, the invention is not limited in this regard.

In step 510, a determination is made regarding the state of the control unit. If the control unit is in an active state, the control signals are communicated in step 512 to the remote slave device. If the control unit is not active, the system returns to step 504 and continues sampling data.

In step 512, the linear translation and rotation command signals are advantageously communicated to the slave device. Those skilled in the art will appreciate that the exact nature of the linear translation and rotation command signals communicated to a slave device or object can vary depending upon the configuration of the slave device or object.

If the interface 101 is used in a haptic control system, the control unit 304 can in step 514 receive haptic feedback data from the remote slave device or object. Such information can typically be in the form of sensor data based on forces exerted upon the slave device. In a virtual environment, such haptic feedback would be computer generated based on various forces exerted on an object in a computer simulation scenario. In step 516, suitable haptic actuator control commands are generated based on the haptic feedback data which has been received. In step 518, these haptic actuator control commands are communicated to haptic actuators within the interface 101. In step 520 a determination is made as to whether the process is complete. If not the process returns to step 504. Otherwise, the process is terminated at 522.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising." Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. An interface for converting human control input gestures to telematic control signals, comprising:
   a plurality of arms comprising
      first articulating arms having base ends spaced apart horizontally on and mounted to an interface base, and
      second articulating arms each having a proximal end coupled to a housing so as to suspend the housing above the interface base and a distal end coupled to a non-base end of a respective one of the first articulating arms in a serial fashion by a joint,
   said first articulating arms and second articulating arms configured to allow linear translational movement of said housing in three orthogonal directions, and to prevent pitch, roll and yaw movement of said housing relative to the interface base;
   at least one first sensor configured for measuring said linear translational movement of the housing in all three orthogonal directions;
   a pivot member disposed in said housing so as to have at least a portion of an outer surface thereof exposed to a surrounding environment, said pivot member arranged to pitch, roll and yaw about a single pivot point;
   a hand grip directly attached to the outer surface of said pivot member which is exposed so that movement of the hand grip by a user of the interface is directly communicated to the pivot member;
   at least one second sensor disposed within said housing for detecting pitch, roll and yaw motion of said pivot member about said pivot point produced by motion of said hand grip.

2. The interface according to claim 1, further comprising a control unit responsive to a plurality of sensor signals produced by said first and second sensors for generating output control signals configured to remotely control linear translational movement in three orthogonal directions, and roll, pitch and yaw movement of a remotely controlled object.

3. The interface according to claim 2, further comprising a trigger switch for selectively transitioning said control unit between an active state and an inactive state, wherein said control unit exclusively provides said output control signals for the linear translational movement and roll, pitch and yaw movement when in an active state.

4. The interface according to claim 3, wherein said trigger switch is disposed on said hand grip.

5. The interface according to claim 2, wherein said interface and said control unit in combination are configured to control a motion of said object with six degrees of freedom including said three orthogonal linear directions, and three different axes of rotation.

6. The interface according to claim 1, wherein said first sensor is an angle sensor which detects a rotation of at least one of said first and second articulating arms relative to said interface base.

7. The interface according to claim 2, wherein said interface base further comprises at least one motive device for applying a force to at least one of said first and second articulating arms.

8. The interface according to claim 7, wherein said object is a remotely controlled robotic device and said control unit is responsive to one or more force sensors of said robotic device for controlling said force applied by said at least one motive device.

9. The interface according to claim 1, wherein said pivot member comprises a ball including a ball surface which is at least partially spherical, and said housing comprises a socket member for receiving said ball, said socket member including a socket surface which is substantially conjugate to said ball surface.

10. The interface according to claim 9, wherein said at least one second sensor is configured to detect roll, pitch and yaw motion of said pivot member about said pivot point by detecting rotation of said ball.

11. The interface according to claim 10, wherein said at least one second sensor is an optical sensor.

12. The interface according to claim 11, wherein said at least one second sensor includes a plurality of said optical sensors, each configured for detecting motion of said ball in at least two orthogonal directions.

13. The interface according to claim 12, wherein said plurality of optical sensors are spaced apart at locations around said ball, and separated by an angle of about 90 degrees.

14. A method for converting human control input gestures to telematic control signals, comprising:
suspending a housing above an interface base using a plurality of arms comprising first articulating arms having base ends spaced apart horizontally on and mounted to the interface base, second articulating arms each having a proximal end coupled to the housing and a distal end coupled to a non-base end of a respective one of the first articulating arms in a serial fashion by a joint;
limiting with said first and second articulating arms movement of said housing so that housing cannot roll, pitch or yaw relative to said interface base;
determining a linear translational movement of a housing in three orthogonal directions by sensing with at least a first sensor a change of position of a plurality of articulating arms mounted at a base end to an interface base and coupled at an opposing end to said housing;
sensing with at least a second sensor a roll, pitch and yaw motion of a pivot member at least partially disposed in said housing about a single pivot point when acted upon by a hand grip directly attached to an exposed surface thereof.

15. The method according to claim 14, further comprising generating with a control unit a plurality of output control signals responsive to a plurality of sensor signals produced by said first and second sensors for remotely controlling linear translational movement in three orthogonal directions, and roll, pitch and yaw movement, of a remotely controlled object.

16. The method according to claim 15, further comprising selectively transitioning said control unit between an active state and an inactive state by operating a trigger switch, said control unit exclusively providing said output control signals for linear translational movement and roll, pitch and yaw movement when in an active state.

17. The method according to claim 15, wherein said control unit controls a motion of said object with six degrees of freedom including said three orthogonal linear directions, and three different axes of rotation.

18. The method according to claim 14, wherein said first sensor is an angle sensor, and said position of said articulating arms is determined by sensing a rotation of at least one of said articulating arms relative to said interface base.

19. The method according to claim 15, further comprising applying a force to at least one of said first and second articulating arms using a motive device disposed in said interface base.

20. The method according to claim 19, wherein said object is a remotely controlled robotic device and said method further includes controlling said force applied by said at least one motive device responsive to one or more force sensors of said robotic device.

21. The method according to claim 14, further comprising detecting with said at least one second sensor roll, pitch and yaw motion of said pivot member about said pivot point by detecting rotation of a ball having a ball surface which is at least partially spherical.

22. The method according to claim 21, wherein said detecting of rotation comprises optically detecting with an optical sensor.

23. The method according to claim 22, further comprising detecting motion of said ball using a plurality of said optical sensors.

24. The method according to claim 23, further comprising spacing said plurality of optical sensors apart at locations around said ball, and separated by an angle of about 90 degrees.

* * * * *